United States Patent [19]

Kao et al.

[11] Patent Number: 4,795,515

[45] Date of Patent: Jan. 3, 1989

[54] PROCESS AND EQUIPMENT FOR MAKING HEXAGON INSULATING SHADE

[76] Inventors: Jamee Kao, 2400 S. Whitehall Dr., #206Q, Mundelein, Ill. 60060; Joseph Hsu, 35 Lane 461 Chung-Shan N. Rd., Sec. 5, Taipei, Taiwan, 111

[21] Appl. No.: 24,695

[22] Filed: Mar. 11, 1987

[51] Int. Cl.$^4$ .............................................. B32B 3/12
[52] U.S. Cl. .................................. 156/197; 156/292; 156/474; 160/84.1; 428/116; 428/181
[58] Field of Search ............... 428/116, 181; 156/292, 156/474, 197; 160/81.1

[56] References Cited

U.S. PATENT DOCUMENTS

| | | | |
|---|---|---|---|
| 4,603,072 | 7/1986 | Colson | 428/116 |
| 4,677,012 | 6/1987 | Anderson | 428/116 |
| 4,685,986 | 8/1987 | Anderson | 428/116 X |

FOREIGN PATENT DOCUMENTS 756270  9/1956  United Kingdom ................ 428/116

Primary Examiner—Henry F. Epstein

[57] ABSTRACT

A method of making a series of expandable tubular polygons by simultaneously pleating and joining two adjacent sheets of fabric.

11 Claims, 3 Drawing Sheets

PROCESS AND EQUIPMENT FOR MAKING HEXAGON INSULATING SHADE

BACKGROUND OF THE INVENTION

Expandable honeycomb structures have been used for many years as window coverings and are in some cases constructed of two separate pleated materials which are secured together either with or without additional materials so they define a plurality of longitudinally extending tubes or cells, one on top of the other. In the retracted state of the honeycomb structure, the adjacent cells are collapsed on each other. An example of such an expandable honeycomb structure is shown in the Anderson U.S. Pat. No. 4,685,986. Anderson forms the honeycomb structure by feeding previously pleated first and second sheets in opposite directions toward a pressure member. As the pleats approach the pressure member, one side of each pleat is covered with an adhesive and thereafter adjacent pleats in the first and second previously pleated sheets are pressed by the pressure member against two reciprocating folding knives and the resulting honeycomb structure is fed in a direction perpendicular to the direction of travel of the first and second pleated sheets.

While the Anderson method produces a satisfactory honeycomb structure it nevertheless is quite costly because it requires the use of previously pleated material.

According to the present invention, the problems noted above in forming expandable honeycomb structures have been ameliorated.

SUMMARY OF THE PRESENT INVENTION

In accordance with the present invention, an expandable honeycomb structure is manufactured including a series of expandable tubular polygons by a method of simultaneously pleating and joining two previously unpleated sheets of fabric. Because the pleating and joining is effected simultaneouly in the same area, significant cost savings in the production of expandable honeycomb structures have been effected.

This unique method is achieved by intermittently feeding first and second sheets of fabric with forming knives at approximately 60 degrees with respect to one another toward a folding and joining area where reciprocating holding knives perform the function of not only holding the pleat during pleat forming by the forming knives but also holding the pleats of one sheet adjacent and aligned with the pleats in the other sheet while a heating mandrel can applies a transverse attaching strip to the pleats just after the pleats are formed.

The resulting expandable honeycomb structure is fed in a direction aligned with a line bisecting the directions of feeding of the first and second sheets of material.

Other objects and advantages of the present invention will appear from the following detailed description.

DETAILED DESCRIPTION OF THE PREFERRED EMBODIMENT

Figure 1:
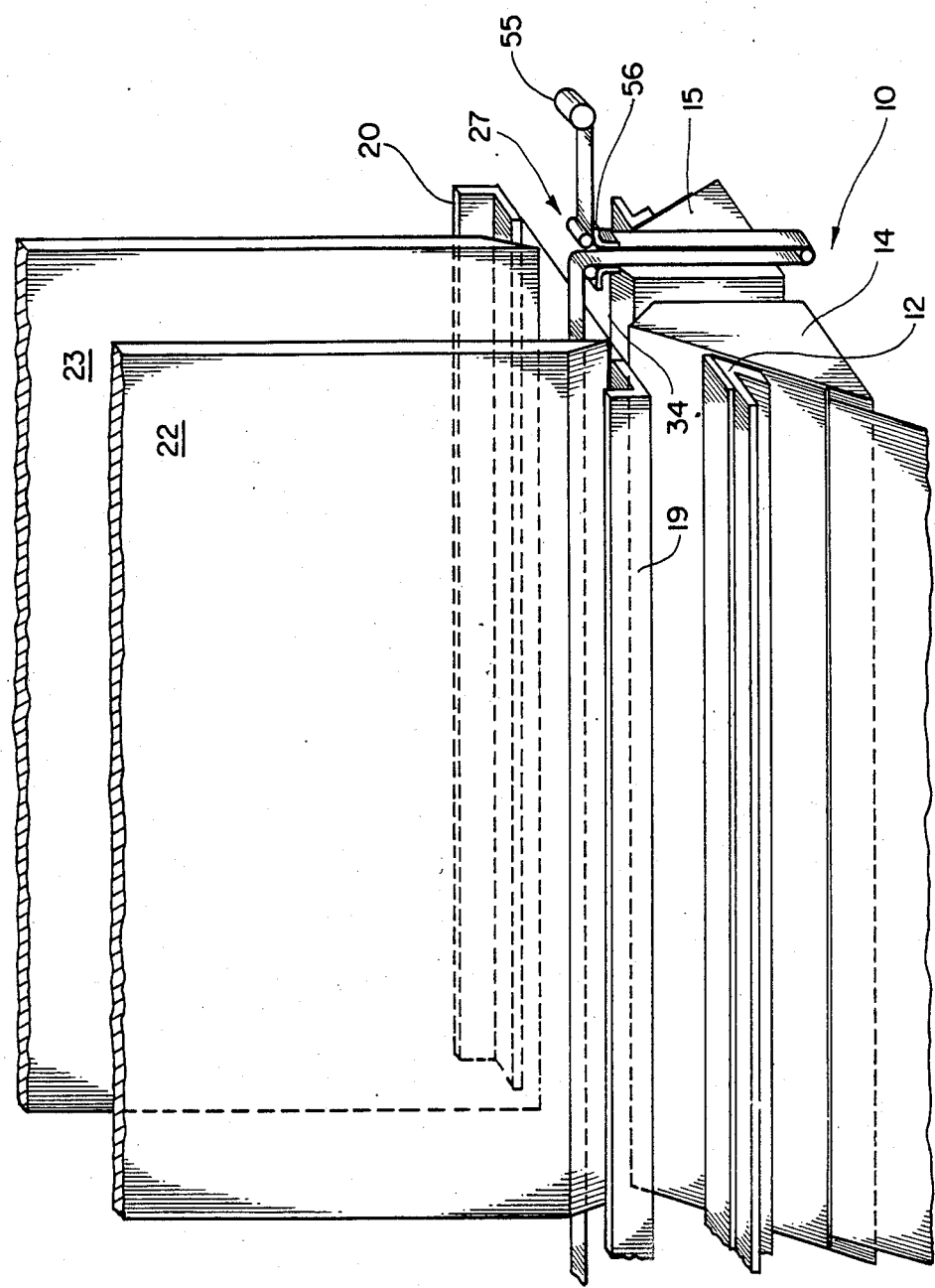
FIG. 1 is a perspective view of a somewhat schematic representation of a pleating and joining machine that performs the method according to the present invention.

Referring to the drawings and particularly FIGS. 1 to 4, a honeycomb forming machine 10 is illustrated generally including a pair of reciprocable forming knife assemblies 12 and 13 each reciprocably mounted on fixed feeding platforms 14 and 15 respectively, a pair of horizontally reciprocable holding knives 19 and 20, a pair of fixed outlet plates 22 and 23, a heat sealing area 25 between the platforms 14 and 15 and an attaching taped feeding assembly 27 for feeding the attaching tape transversely to the pleats.

Figure 2:
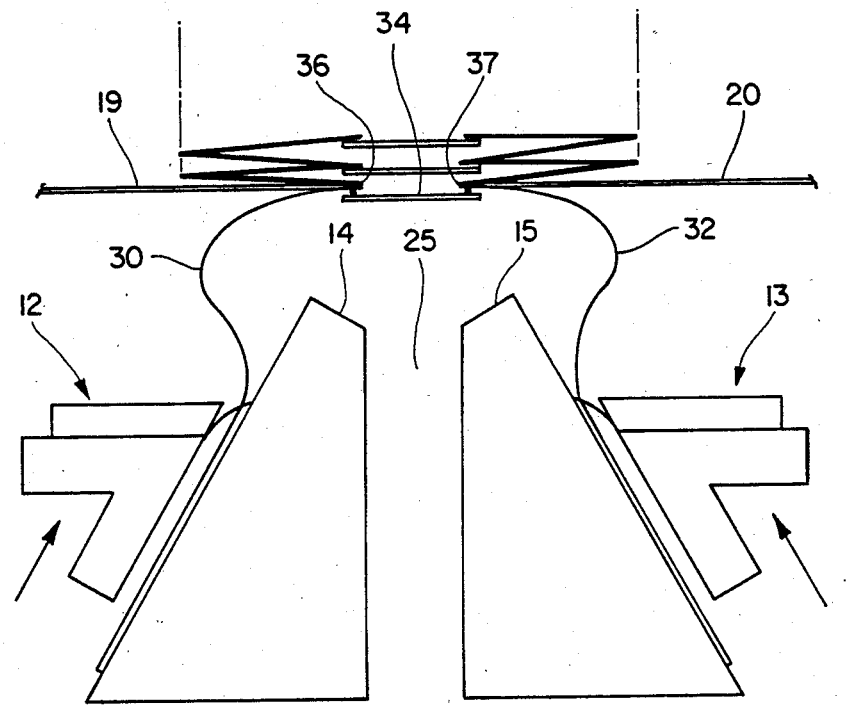
FIG. 2 is an end view of the machine illustrated in FIG. 1 as the forming knives begin an adjacent set of pleats after the attaching strip has been applied.
Figure 3:
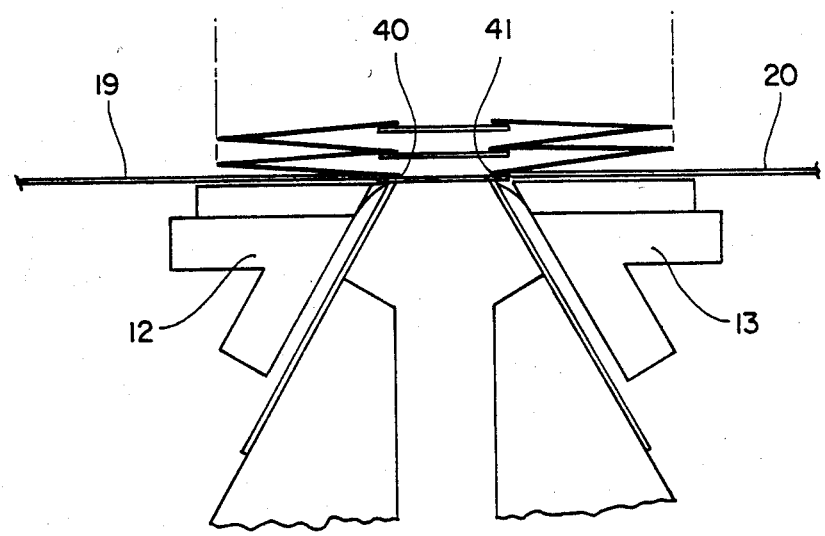
FIG. 3 is an end view of the machine illustrated in FIG. 1 generally similar to FIG. 2 with the forming knives completing adjacent pleats.
Figure 4:
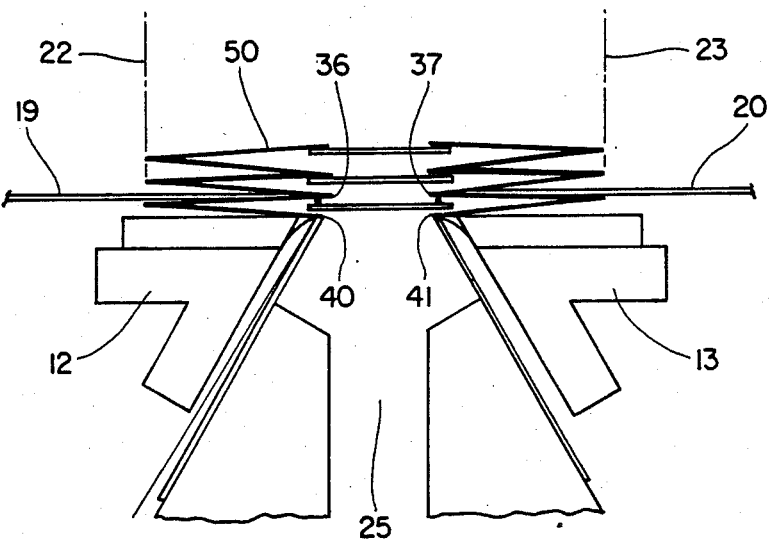
FIG. 4 is an end view of the forming machine similar to FIG. 3 with the forming knives beginning their withdrawal after the attaching strip has been applied.
Figure 5:
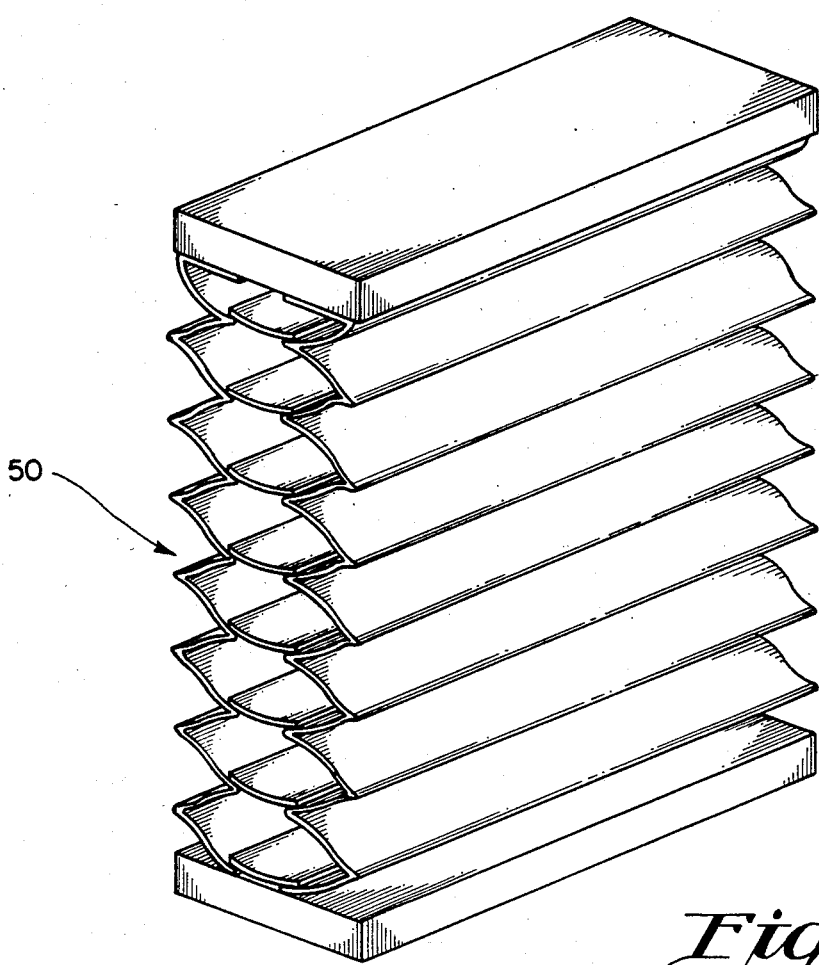
FIG. 5 is a perspective view of the resulting honeycomb structure.

As seen in FIGS. 2 to 4, forming knife 12 feeds a first sheet of flexible fabric 30, preferably containing some 60% polyester, in a direction approximately 60 degrees with respect to the direction forming knife 13 intermittently feeds sheet fabric 32.

In the position of the forming knives 12 and 13 illustrated in FIG. 2, attaching strip 34 has already been applied to pleats 36 and 37 in first and second sheets 30 and 32, and the forming knives 12 and 13 are reciprocating upwardly looping the first and second sheets as the holding knives 19 and 20 hold pleats 36 and 37 in postion.

As the forming knives 12 and 13 move upwardly from the position illustrated in FIG. 2 to the position illustrated in FIG. 3, they form additional pleats 40 and 41.

Thereafter the forming knives 12 and 13 begin withdrawal and the holding knives 19 and 20 reciprocate out of pleats 36 and 37 and into pleats 40 and 41, and hold pleats 40 and 41 in position while the heat sealer moves upwardly in space 25 attaching strip 34 to pleats 40 and 41.

The holding bars or plates 22 and 23 direct the resulting honeycomb structure 50 on a central line that bisects the angle of feeding the first and second sheets 30 and 32.

As seen in FIG. 1, the attaching tape assembly 27 includes a tape roll 55 and a roller assembly 56 that feeds tape 34 in a direction transverse to the direction of feeding the material sheets 30 and 32.

According to this method, it provides polygonal expandable insulating cells that are not only durable, but clean cut in appearance with no stag or fray, no wrinkles or wraps and also results in material savings. It is also possible that different fabrics can be utilized and in fact one to three different materials can be utilized in the present method. It furthermore has the capability of providing one, two or three colored honeycomb structures by varying the colors of the individual fabrics making up the first and second sheets and the attaching tape.

We claim:

1. A method of making a series of expandable tubular polygons, comprising: intermittently feeding a first sheet of material toward a reciprocating holding knife with a forming knife to form a plurality of pleats in the first sheet, intermittently feeding a second sheet of material toward a second reciprocating holding knife adjacent the first holding knife to form a plurality of pleats in the second sheets immediately adjacent pleats in the first sheet, and immediately after forming each adjacent pleat attaching the adjacent pleats in the first and second sheets together to form the series of expandable tubular polygons.

2. A method of making a series of expandable tubular polygons as defined in claim 1, including feeding a third sheet transverse to the first and second sheets, said step of attaching the adjacent pleats together including attaching the third sheet to the first and second sheet pleats.

3. A method of making a series of expandable tubular polygons as defined in claim 1, wherein the step of feeding the first and second sheets includes feeding them with a reciprocating forming knife.

4. A method of making a series of expandable tubular polygons as defined in claim 1, wherein the step of feeding the first and second sheets includes feeding the first and second sheets each at an angle of approximately 60 degrees with respect to their respective holding knives.

5. A method of making a series of expandable tubular polygons as defined in claim 1, wherein the step of feeding the first and second sheets includes feeding the first and second sheets at an angle of approximately 60 degrees with respect to one another.

6. A method of making a series of expandable tubular polygons as defined in claim 1, wherein the step of feeding the first and second sheets includes feeding the first and second sheets each at an angle of approximately 60 degrees with respect to the attached pleats.

7. A method of making a series of expandable tubular polygons, comprising: feeding a first flexible sheet toward a folding area, feeding a second flexible sheet toward the same folding area, simultaneously folding the first and second sheets in the folding area so successive pleats in the first sheet is adjacent and aligned with pleats in the second sheet, and attaching adjacent pleats in the first and second sheets together immediately after forming each pleat to form the series of tubular polygons.

8. A method of making a series of expandable tubular polygons as defined in claim 7, including feeding a third sheet transverse to the first and second sheets, said step of attaching the adjacent pleats together includes attaching the third sheet to the first and second sheet pleats.

9. A method of making a series of expandable tubular polygons as defined in claim 7, wherein the step of feeding the first and second sheets includes feeding the first and second sheets each at an angle of approximately 60 degrees with respect to one another.

10. A method of making a series of expandable tubular polygons as defined in claim 7, wherein the step of feeding the first and second sheets includes feeding the first and second sheets an angle of approximately 60 degrees with respect to the attached pleats.

11. A method of making a series of expandable tubular polygons, comprising: intermittently feeding a first sheet of material toward a reciprocating holding knife with a forming knife to form a plurality of pleats in the first sheet, intermittently feeding a second sheet of material toward a second reciprocating holding knife with another forming knife adjacent the first holding knife to form a plurality of pleats in the second sheets immediately adjacent pleats in the first sheet, immediately after forming each adjacent pleat attaching the adjacent pleats in the first and second sheets together to form the series of expandable tubular polygons, and feeding a third sheet transverse to the first and second sheets, said step of attaching the adjacent pleats together including attaching the third sheet to the first and second sheet pleats, the step of feeding the first and second sheets including feeding the first and second sheets each at an angle of approximately 60 degrees with respect to their respective holding knives.

* * * * *